Jan. 17, 1956  R. M. SNOW  2,731,295
SPRAYING APPARATUS
Filed June 21, 1954
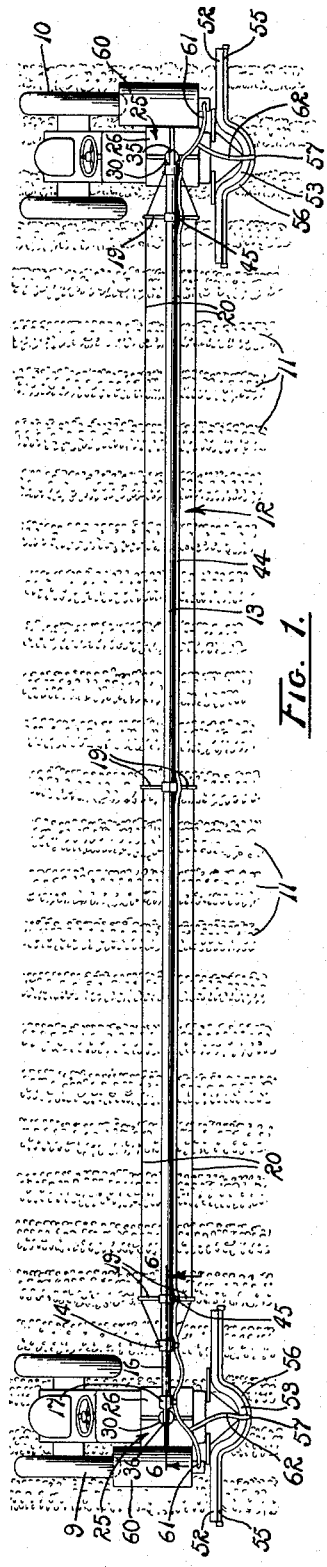
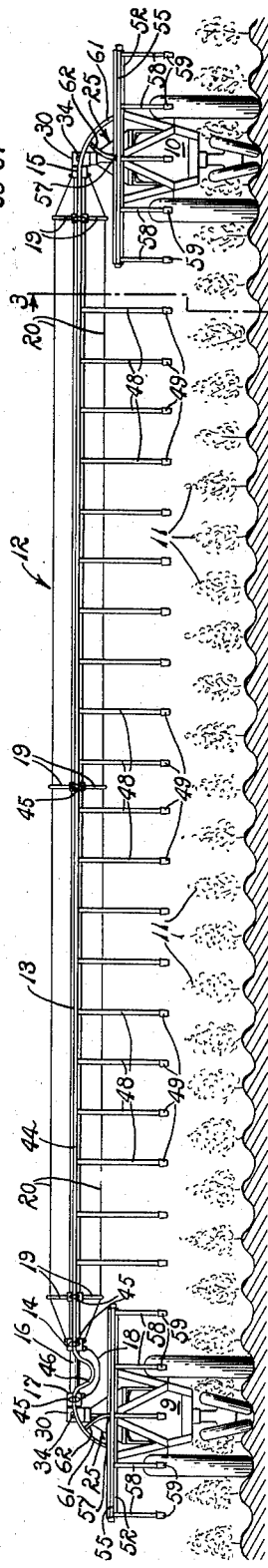
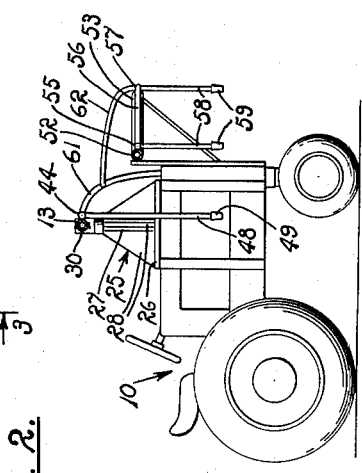
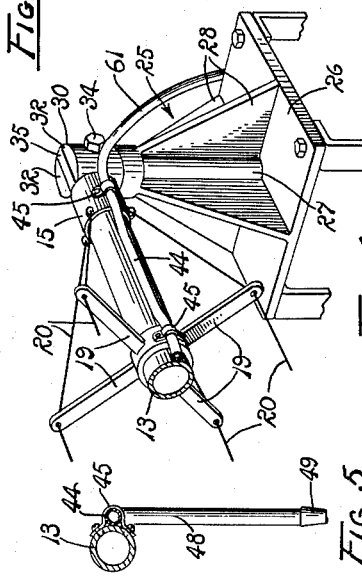
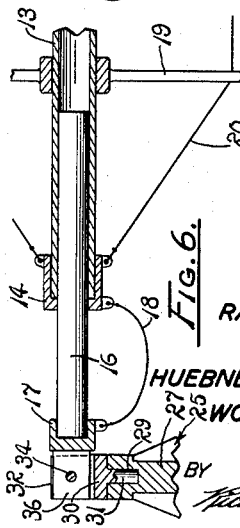
RAYMOND M. SNOW
INVENTOR
HUEBNER, BEEHLER,
WORREL & HERZIG
ATTORNEYS
BY Richard M. Worrel

United States Patent Office 2,731,295
Patented Jan. 17, 1956

2,731,295

SPRAYING APPARATUS

Raymond M. Snow, Fresno, Calif.

Application June 21, 1954, Serial No. 438,114

3 Claims. (Cl. 299—30)

The present invention relates to spraying apparatus and more particularly to mobile apparatus for spraying wide swaths of soil or agricultural crops during earth traversing movement thereof.

In the cultivation of crops and in the treatment of soils, it often becomes necessary to distribute through dispersal application various substances such as source materials for soil nutrients, weed and insect killers and the like. In this regard many forms of spraying and/or crop dusting devices have been known for the application of the desired treating mediums. Where the crop covers a large acreage, such as is generally found in cotton farming, the application of soil and/or crop treating substances by airplane has been well-known and in some instances sufficiently effective to achieve the desired results. Airplanes possess certain advantages in volume application. However, in many instances, crop spraying by airplane is expensive, inefficient in its waste of material and ineffective for the purposes intended. That such application is generally expensive for the average farmer or individual is believed well established. Illustrative of the inefficiency and ineffectiveness of airplane application under certain conditions are the instances where the soil and/or crop must be thoroughly and uniformly covered with a treating chemical. For example, in the killing of weeds either prior to or after emergence of cotton plants and in the defoliation of cotton the application of treating medium by airplane has proved uneconomical and in many instances ineffective because of excessive dispersal and waste.

The other known method for applying soil and/or crop treating chemicals is by spraying apparatus drawn by, or attached to, some convenient vehicle, generally a tractor. These usually include long pipes or hollow booms having discharge orifices for sprinkling or spraying the medium therefrom in liquid form. At best, only a few rows covering a relatively narrow span are within the scope of the presently employed sprayers of this type and therefore only a small area may be sprayed during a sweep of the apparatus from one end of a field to the other. Not only are such operations less efficient than desired but many such apparatus damage crops through which they are caused to travel and the requisite repeated travel due to narrow swath application multiplies such damage.

Therefore, an object of this invention is to provide a ground engaging, earth traversing spraying apparatus adapted to span a wide spraying swath for simultaneous application of spraying medium to the entire swath.

Another object is to provide a wide area spraying apparatus adapted to be drawn over the ground, which can be turned and/or reversed in direction in a conveniently maneuverable manner.

Another object is to provide a spraying apparatus in accordance with the foregoing objects which is adapted to apply uniformly and thoroughly required quantities of treating medium to the soil and/or crops.

Another object is to provide an apparatus of the foregoing nature adapted to spray soil and/or crops with a minimum of damage thereto from the mechanism associated with the apparatus.

Another object is to provide a spraying apparatus adapted for convenient connection or mounting on conventional farm implements, such as tractors, trailers, trucks and the like, for cooperative use therewith.

Another object is to provide a spraying apparatus simply, economically and readily constructed from relatively few parts.

These and other objects will become apparent on reference to the following description and accompanying drawing.

In the drawing:

Fig. 1 is a plan view of the spraying apparatus constituting the subject matter of the present application and showing such apparatus in use on a field of cotton or other agricultural crop.

Fig. 2 is a front view of the apparatus as shown in Fig. 1.

Fig. 3 is a fragmentary somewhat enlarged side view of one of the tractors employed with the present invention.

Fig. 4 is a fragmentary enlarged perspective view of a part of the support elements utilized in the device of the present invention.

Fig. 5 is an enlarged transverse cross section taken through the spray pipe or conduit of this invention.

Fig. 6 is a fragmentary somewhat enlarged section taken on line 6—6 of Fig. 1.

For convenience, the spraying apparatus is described as being used to spray cotton plants. As the description proceeds, it will be recognized that this apparatus is especially useful in this regard. However, it is not intended so to limit the application of the spraying apparatus and it will be readily recognized that the apparatus may be employed in many and diverse spraying operations.

As shown in Fig. 1, the spraying apparatus of this invention includes a pair of prime movers, such as the tractors 9 and 10, laterally spaced for substantial parallel earth traversing movement longitudinally of the rows of cotton, indicated at 11. The tractors 9 and 10 are adapted to transport therebetween a frame, generally denoted by the numeral 12.

The frame 12 is provided with an elongated hollow boom 13 mounted on one of the tractors 10 in a manner subsequently to be described and oriented therebetween substantially transverse to the direction of movement of the tractors. The boom 13 is provided with opposite end portions 14 and 15 and includes a stud 16 mounted on the tractor 9 and slidably connected at the end 14 of the boom thus permitting sliding movement of the boom 13 relative to the tractors. This construction, as will be understood, allows limited inward and outward relative movement of the tractors 9 and 10. The stud 16 is mounted in a cap 17 for attachment to the tractor 9 in a manner to be described. A heavy cable 18 is connected between the cap 17 and end 14 of the boom 13 for limiting outward sliding movement of the boom 13 on stud 16 or equivalent structure utilized to limit such movement.

Since it is desired to position the boom 13 in spaced relation to the ground being traversed and also in a substantially horizontal position, the frame 12 includes a plurality of transverse truss members 19 divergently extended outwardly from the boom 13 at spaced positions therealong. The truss members 19 are rigid and have connected at the outer ends thereof longitudinally extending bracing members or cables 20. Each of the bracing members 20 is connected at the outer ends thereof to the end portions 14 and 15 of the boom 13. In this manner, the boom is held in a substantially horizontal position spaced from the ground and is prevented from excessively sagging centrally thereof during movement of the spraying apparatus over the ground. It should also be noted that the truss members 19 and cables 20 do not interfere with sliding movement of the boom as provided by the stud 16.

The manner of connecting the end portion 15 and stud 16 to each of the tractors 10 and 11 is identical and therefore only one such connection will be considered in the following description. Accordingly, referring to the tractor 10, it will be seen that a turret 25 is mounted thereon. The turret 25 includes a base member 26 having a central tubular portion 27 upstanding therefrom and being rigidly held in place by spaced flanges or gusset plates 28 which add strength to the turret. The upper end of tubular portion 27 provides a bore 29 therein, as best seen in Fig. 6. A bifurcated yoke 30 having a stub portion 31 and a pair of sides 32—32 is mounted on the tubular portion 27 with the stub 31 forming a vertical axle revolvably seated in the bore 29. A pin 34 extends between the sides 32—32 of the member 30 to provide a substantially horizontal axle.

The end portion 15 of boom 13 is provided with a lug 35 which is pivotally connected to the turret 25 on the horizontal axle or pin 34, as seen in Fig. 4, and the stud 16 is likewise provided with a lug 36 for pivotal connection to the pin 34 on the turret 25 provided on tractor 9, as seen in Fig. 6. It will be evident, therefore, that the boom 13 is adapted to pivot both in a horizontal plane and a limited distance in a vertical plane as provided by the vertical and horizontal axles of the turrets 25 on each tractor. In this manner full universal movement is attained. Considering boom 13 as a whole, it will be evident that a limited pivoting movement of the tractors 10 and 11 incident to tilting thereof as they advance over the ground is permitted by the substantially horizontal axle or pin 34. Further, the revolvable connection of the boom 13 on the substantially vertical axles provided by studs 31 and bores 29 permits turning movement of the tractors and also accommodates positioning of the boom 13 in an angular position relative to the direction of travel when one of the tractors advances forwardly or lags rearwardly relative to the other tractor.

An elongated rigid or flexible conduit 44 is attached to the boom 13 in any convenient manner, such as by straps 45 or by welding, and is substantially coextensive therewith. The conduit 45 is provided with a flexible or slacked section 46 bridging the stud 16 of the boom 13. It will be evident that this manner of construction of the conduit 44 accommodates telescopic sliding movement of the boom 13. A plurality of flexible hose members 48 are connected to the conduit 45 at spaced positions therealong and depend therefrom to positions upwardly spaced from the ground. The lower end of each of the hose members 48 is equipped with a discharge nozzle 49 adapted to diffuse and spray a fluid medium in predetermined directions therefrom. As applied to use with row crops, such as cotton, the spacing between the flexible hose members 48 corresponds to the spacing between the rows of cotton. For example, as shown in the drawings, the discharge nozzles 49 are adapted to extend between the cotton plants whereby the spraying medium may be diffused onto the plants from the sides thereof. Obviously, this particular relationship may be varied to suit the needs of the particular application of the spraying apparatus.

It will be understood from the description thus far, that the primary purpose of boom 13 is to support the conduit 44 between the tractors 9 and 10. The features of the boom providing telescopic extension and retraction thereof as well as the frame work adding rigidity thereto are all incorporated to support the conduit 44 and to permit convenient maneuverability of the tractors with booms and conduits of appreciable lengths without exerting undue strain on the boom or conduit.

Each of the tractors 9 and 10 further is provided with a support arm 52 mounted at the forward end of the tractor each of which has a central bowed section 53 extending forwardly of the tractor. The support arms 52 are mounted transversely to the direction of movement of the tractors and extend outwardly from each side thereof. Each arm 52 mounts a pipe 55 thereon which is provided with a central bowed portion 56 corresponding to the bowed portion 53 of its respective arm 52. The bowed portion 56 of each pipe 55 provides a convenient inlet connection 57. Each of the pipes 55 is further provided with a plurality of flexible hose members 58 dependently connected to the pipes in much the same manner as the hose members 48 are connected to conduit 44. Each of the flexible hose members 58 is provided at its lower end with a discharge nozzle 59 adapted to diffuse spraying medium in the manner above desvribed relative to the nozzles 49.

A supply of fluid spraying medium is provided for feeding the conduit 44 and pipes 55. For this purpose a reservoir or tank 60 filled with water or a treating chemical under pressure is mounted on each tractor 9 and 10. A fluid pump, although not shown, could be mounted on either or both of the tractors. A short length of conduit 61 connects the tank 60 with conduit 44 and a branch conduit 62 connects conduit 61 to the inlet connection 57 provided on pipe 55. A valve, not shown, controls the output flow of fluid from each tank 60 into conduits 61. It will be recognized that any convenient supply means could be utilized rather than that shown. For example, a pump and reservoir can be employed and having a flexible hose attached to conduit 44 and pipe 55. Also only one tank 60 need be used, two being shown and described since more uniform pressure distribution and flow and thus discharge from nozzles 49 and 59 occurs when supply is provided from each end of the conduit 44.

*Operation*

The operation of the invention is believed to be evident from the foregoing description and is briefly summarized at this point. The spraying apparatus is connected as shown in Fig. 1 wherein the boom 13 extends in a substantially horizontal manner between the pair of tractors 9 and 10. Assuming that it is desired to apply a soil conditioning or crop treating medium to a field of cotton by means of the spraying apparatus, the tractors 9 and 10 are driven onto the field each straddling substantially two rows of cotton plants as shown in the drawing. The boom 13, extended between the tractors, is adapted to span approximately forty rows of cotton on forty inch centers. Obviously, the length of the boom 13 may be varied to cover more or fewer rows within its sweep. The depending flexible hoses 48 and 58 are preferably transversely spaced along boom 13 on the conduit 44 to extend between the rows of cotton plants. It will be apparent that inward or outward movement of tractor 10 serves to vary somewhat the positioning of hoses 48 relative to the rows of cotton plants.

Assuming therefore, that the tractors 9 and 10 are driven through the field of cotton and that the discharge hoses 48 and 58 are disposed as shown, the supply of spraying medium from tanks 60 is turned on by suitable valves, not shown, and permitted to flow through the conduit 44 and pipes 55. Consequently, spraying medium is diffused outwardly from the discharge nozzles 49 and 59 onto the cotton plants as the entire spraying apparatus is driven in earth traversing manner over the field of cotton. It will be evident that this method of application of spraying medium is effective thoroughly and uniformly to cover a large number of cotton plants at a single operation.

Because the boom 13 is connected slidably to tractor 9 by stud 16 and because of the slacked flexible portion 46 of the conduit 44, the tractors 10 and 11 may move inwardly or outwardly a limited amount relative to each other during operation. The cable 18 prevents boom 13 from completely sliding off the stud 18, as will be apparent. The frame 12 supports the boom 13 and thus the conduit 44 is in a substantially horizontal position and prevents excessive sagging thereof during its movement over the ground.

When it is desired to turn the spraying apparatus around after a length of field has been traversed, it is only necessary to turn each of the tractors 9 and 10 in a normal and substantially co-ordinated manner. In normal field operation, the boom 13 remains parallel to its normal operating position even during turns. When both tractors turn 90° in the same direction, they are then in earth traversing alignment. This is normally performed at the end of a traversing movement of the field. When a successive, usually adjacent, group of rows are selected for spraying, each of the tractors are turned 90° further and thus, fully reversed, carry the boom in continued parallelism for spraying operations. It will be apparent that when the tractors are in alignment, the entire apparatus may travel along a road without requiring excessive width, may pass through restricted openings, as between trees or other obstructions, and is readily moved from place to place.

Because of the rotatable or swivel joint provided by turret 25 connecting the boom 13 to each of the tractors, the latter are permitted to turn easily through 180°, or a greater or less angle, without fracturing the boom or causing binding or interference thereof with such turning movement. It should also be noted in this regard, that during turning movement of the spraying apparatus the leading tractor, for example 9, when a counterclockwise turn is negotiated, may exert a substantial pull on the following tractor 10 through the boom 13. Also tractor 10 may exert a measure of pushing action on tractor 9, if desired, through the medium of the boom. The reverse is true on clockwise or reverse turning movement of the apparatus. For this reason, the connection of boom 13 to each tractor is made quite strong as the connecting elements therebetween are subjected to a substantial amount of thrust during such turning movement.

The particular connection of boom 13 to the tractors 9 and 10 by the turret 25 is advantageous in several other respects believed worthy of note. During normal movement of the tractors over the rows of cotton, it is quite likely that the speed of the tractors 9 and 10 may not always be identical and thus one tractor may move ahead or lag behind the other tractor. A limited amount of such relative movement is permitted by the turret 25 since the boom 13 pivoting around the vertical axle provided by stub 31 rotating in bore 29 enables the boom to orient itself to an obliquely angulated attitude relative to the forward direction of the tractors. Furthermore in the event that either of the tractors tilts from side to side when advancing over uneven terrain, the boom 13 will tend to remain in a substantially horizontal position, or in any event, because of its pivotal connection on the horizontal pins 34, will accommodate such tilting movement of the tractors without binding.

From the foregoing, it will be evident that a spraying apparatus has been provided which conveniently and economically applies liquid treating medium to the soil or crops planted therein. The construction of the device enables easy manipulation of the otherwise rather unwieldy elements employed to treat such wide areas or segments simultaneously. Although the device has been described in relation to the spraying of cotton it will be evident that the spraying apparatus could be employed to apply various types of treating mediums to a variety of crops or even could be used as a water sprinkler for soil, grass or other crops if adequate reservoir facilities are provided.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An apparatus for spraying a wide swath of row crops comprising a pair of supports spaced transversely of the rows of crops, each of the supports including a turret having a vertical and a horizontal pivot axle, an elongated boom extended between the supports, and having opposite ends connected to the horizontal pivot axles of the turrets, said boom having a telescopic section therein, a conduit mounted on the boom having an extensible section therein bridging the telescopic section of the boom, discharge nozzles on said conduit at spaced intervals therealong for directing spraying medium onto the crops, and carrying means for each of the supports for imparting earth traversing movement to the boom longitudinally of the row crops with the boom extended transversely thereof.

2. An apparatus for spraying a wide swath comprising a pair of prime movers spaced for movement in substantially parallel paths, a turret revolvably supported on each of the prime movers each providing a substantially horizontal pivot pin, an elongated boom adapted for extension and contraction having opposite ends and extending between the prime movers being oriented in a substantially transverse position relative to the parallel paths, each end of the boom being journalled on the horizontal pivot pin associated with the turret of its respective prime mover, an elongated conduit attached to the boom and being substantially coextensive therewith, said conduit having a flexible portion therein to accommodate longitudinal extension and contraction of the boom, and a plurality of discharge nozzles spaced along the conduit and adapted to diffuse spraying medium in the area between the prime movers.

3. A wide area spraying apparatus comprising a pair of prime movers laterally spaced from each other for parallel earth traversing movement; a turret mounted on each of the prime movers each including a yoke mounted for rotation on a substantially vertical axis, each yoke being provided with a substantially horizontal axle pin, an elongated boom extending between the prime movers and having opposite end portions pivoted on the horizontal axle pin provided by the yoke of its adjacent prime mover, said boom having an extensible section including a stud slidably and non-removably connected therein permitting limited extension and retraction of the boom, a fluid conduit attached to the boom extending substantially coextensively therewith, said conduit having a flexible section bridging the stud in the boom, a plurality of flexible hoses dependently connected to the conduit at spaced positions therealong and having discharge nozzles at the lower ends thereof, and a supply of spraying medium connected to the fluid conduit whereby spraying medium may be diffused from the discharge nozzles into the area between the prime movers during earth traversing movement of the boom by the prime movers.

References Cited in the file of this patent

UNITED STATES PATENTS

| | | |
|---|---|---|
| 1,321,350 | Alvarez | Nov. 11, 1919 |
| 2,628,863 | Maggar | Feb. 17, 1953 |